(12) United States Patent
Shirani-Mehr et al.

(10) Patent No.: US 9,787,366 B1
(45) Date of Patent: Oct. 10, 2017

(54) NEAR FIELD COMMUNICATION DETECTION IN WIRELESS CHARGING SYSTEMS

(71) Applicant: Intel Corporation, Santa Clara, CA (US)

(72) Inventors: Hooman Shirani-Mehr, Portland, OR (US); Ahmad Farbod Khoshnevis, Portland, OR (US); Anand Konanur, Sunnyvale, CA (US); Steven Gaskill, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/197,184

(22) Filed: Jun. 29, 2016

(51) Int. Cl.
*H04B 7/00* (2006.01)
*H04B 5/00* (2006.01)
*H04M 3/42* (2006.01)
*H04W 8/00* (2009.01)
*H02J 7/02* (2016.01)
*H02J 50/90* (2016.01)

(52) U.S. Cl.
CPC ............ *H04B 5/0037* (2013.01); *H02J 7/025* (2013.01); *H02J 50/90* (2016.02); *H04W 8/005* (2013.01)

(58) Field of Classification Search
CPC .................................................. H04B 5/0037
See application file for complete search history.

(56) References Cited

U.S. PATENT DOCUMENTS

| | | | |
|---|---|---|---|
| 9,191,075 B2 * | 11/2015 | Jung | H04B 5/0037 |
| 9,306,636 B2 * | 4/2016 | Kwon | H02J 50/60 |
| 2013/0084803 A1 * | 4/2013 | Hall | H04W 52/0277 |
| | | | 455/41.1 |
| 2014/0159653 A1 * | 6/2014 | Von Novak | H04B 5/0031 |
| | | | 320/108 |

* cited by examiner

*Primary Examiner* — Tilahun B Gesesse
(74) *Attorney, Agent, or Firm* — Eversheds Sutherland (US) LLP

(57) ABSTRACT

This disclosure describes systems, methods, and apparatus related to near field communication (NFC) detection. A device may determine a first device in proximity to a charging area of the device. The device may detect a presence of a first NFC device in proximity to the charging area of the device. The device may determine the first NFC device is associated with the first device. The device may determine to transition the device to one or more operating modes based at least in part on the presence of the first NFC device.

20 Claims, 9 Drawing Sheets

| 7 | 6 | 5 | 4 | 3 | 2 | 1 | 0 |
|---|---|---|---|---|---|---|---|
| NFC Receiver | RFU | Power Control Algorithm Preference | Adjust power capability | Charge Complete Connected Mode | PTU Test Mode | RFU | RFU |
| 0= Not supported 1= supported | | 0= $V_{RECT\_MIN\_ERROR}$ 1= Max System Efficiency | 0= Not supported 1= supported | 0= Not supported 1= supported | 1 = Yes 0 = No | RFU | RFU |

FIG. 2

Table 300

| Origin State | Destination State | Required or Optional | Additional Required conditions | Exceptions |
|---|---|---|---|---|
| PTU Power Save | PTU Latching Fault or PTU Local Fault | Required or Optional | If PTU detects NFC tag and not received a valid advertisement after x seconds (e.g. x=0.2) | None |
| PTU Low Power | | | | |
| PTU Power Transfer | | | | |

302

Table 350

| Origin State | Destination State | Required or Optional | Additional Required conditions | Exceptions |
|---|---|---|---|---|
| PTU Power Save | PTU Latching Fault or PTU Local Fault | Required or Optional | If 'NFC receiver' = 0 in the PRU Static and PTU detects NFC tag | None |
| PTU Low Power | | | | |
| PTU Power Transfer | | | | |

NEAR FIELD COMMUNICATION DETECTION IN WIRELESS CHARGING SYSTEMS

TECHNICAL FIELD

This disclosure generally relates to systems and methods for wireless charging stations, more particularly, to near field communication (NFC) detection in wireless charging systems.

BACKGROUND

Wireless charging or inductive charging uses a magnetic field to transfer energy between devices. Wireless charging may be implemented at a charging station. Energy is sent from one device to another device through an inductive coupling. The inductive coupling is used to charge batteries or run a device. Power is delivered through non-radiative, near field, magnetic resonance from a power transmitting unit (PTU) to a power receiving unit (PRU).

An NFC device is a device that may operate in accordance with a set of standards that establishes radio communication to communicate with another proximate NFC device. In some instances, an NFC device may include an NFC tag or maybe associated with an NFC tag.

BRIEF DESCRIPTION OF THE DRAWINGS

FIG. 2 depicts an illustrative PRU static parameter, in accordance with one or more example embodiments of the present disclosure.

FIGS. 3A-3B depict illustrative PTU operation modes tables, in accordance with one or more embodiments of the disclosure.

DETAILED DESCRIPTION

Figure 1:
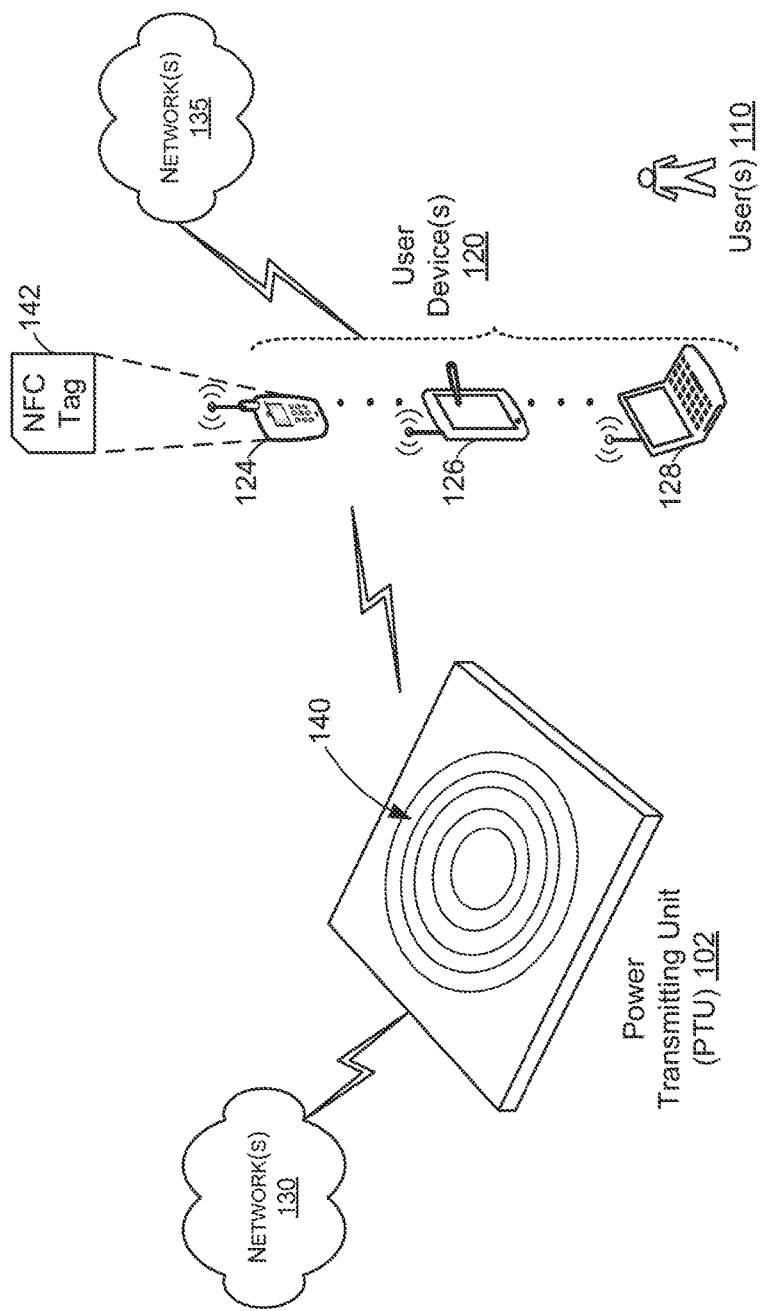
FIG. 1 depicts a network diagram illustrating an example network environment for near field communication (NFC) detection, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A power transmitting unit (PTU) may transmit power wirelessly to charge one or more power receiving units (PRUs). The PTU's current conducted through its coil generates a magnetic field. PRUs placed in this magnetic field convert the magnetic field into a voltage that is used for powering the device or charging the battery. PRUs placed in the PTU's magnetic field area send back their operation information to the PTU during various stages of wireless charging. For example, during a handshake procedure, where a PRU may advertise its capabilities to the PTU. The one or more PRUs placed in the PTU's magnetic field area send back their operation information to the PTU. Such information may include a PRU's rectifier voltage and the rectifier current, among other parameters.

With the advancement in computing devices, an increasing number of devices supporting NFC may also require wireless charging. Such devices may utilize one or more NFC tags in order to take advantage of NFC technology. An NFC device may be a device that includes an interface for communicating over the air. An example of such a device is a mobile device. The application of NFC technology can be extended to an increased variety of devices and is not limited to mobile devices. For example, an NFC device may be a lamp or other devices. Wireless charging may adversely affect an NFC tag because of its form-function. Generally, NFC tags do not require batteries. The NFC tags get their power from just being near a powered NFC device (e.g., a mobile device). The NFC tags get their power from an active device (e.g., a mobile device) generating a magnetic field which induces an electric current in the antenna of the passive device (e.g., the NFC tag) which powers up the NFC chip. The NFC tag then creates a further magnetic field, which can in return be read by the active device (e.g., the mobile device) allowing data to be transferred. The NFC tag may be internal to an NFC device (e.g., inside a lamp) or may be external (e.g., on a poster). Exposing an NFC tag to the wireless charging of the PTU may overheat the NFC tag and may damage its circuitry including its NFC chip.

Example embodiments of the present disclosure relate to systems, methods, and devices for NFC detection.

In one embodiment, a PTU may transition from an operational state to a fault state based at least in part on a determination of an NFC tag. Typically, the PTU may be configured to operate in one or more states. For example, the PTU may be in a PTU power save state, a PTU low-power state, a PTU power transfer state, etc. these states may be based at least in part on a wireless charging standard such as the AirFuel Alliance (AFA) wireless charging standard or any other wireless charging standard. The fault state may prevent the PTU from sending power to devices that may be in proximity of the PTU. This may prevent the NFC tag from being damaged by exposing the NFC tag to the wireless charging of the PTU. Further, this may prevent an interruption to the wireless charging when a device contains NFC tags that are supported and protected from the wireless charge.

In one embodiment, in order for the PTU to determine when to transition to the fault state, the PTU may analyze PRU information received from a PRU that may be associated with an NFC device (e.g., an NFC tag). The PRU may transmit during, for example, a handshake procedure with the PTU, PRU static information including, but not limited to, whether the NFC device is supported and protected by the PRU.

In one embodiment, the PRU information may include an NFC bit that may be set based at least in part, on whether NFC is supported and/or protected on a PRU. For example, after the PRU sets the NFC bit to "0," or "1," the PRU may send the PRU information that includes the set NFC bit to the PTU. The PTU may receive the PRU information on an interface for communicating over the air. The PTU may decode the PRU information and may extract the NFC bit. The extracted NFC bit may be set, for example, to either "0" or "1."

In one embodiment, the PTU may determine whether the NFC bit is set to "0" or "1," in order to determine whether to transition to a fault state or not. For example, if the NFC bit is set to "0" in the PRU information received from the PRU, the PTU may determine whether an NFC tag is detected in the proximity of the PTU or not. If the PTU detects an NFC tag, the PTU may transition to a fault state, such as a latching fault state or a local fault state. A latching fault state may be a fault state that may impact the wireless charging system, including, devices involved in the wireless charging system such as PRUs, PTU, or any other devices involved in the wireless charging system. A local fault state may be a fault state that affects the PTU.

In one embodiment, if the PTU determines that the NFC bit is set to "1," the PTU may determine whether an NFC tag or other NFC devices are detected. In that case, if the PTU does detect an NFC tag or other NFC devices, then the PTU may not transfer to a fault state. If the PTU had already detected the NFC tag or other NFC devices, and the PTU had already transitioned to a fault state due to the detection of the NFC tag or other NFC devices, the PTU may clear the fault and may resume normal operation.

In one embodiment, if the PTU detects an NFC tag or other NFC devices, the PTU may listen for messages (e.g., advertising messages, etc.) that are typically received from a PRU. The advertising messages may include information that may determine that the device sending the advertising messages is a PRU and not an NFC tag. In the case that the PTU does not receive a valid advertising message after a predetermined time, the PTU may determine that detected NFC tag is not protected and therefore the PTU may transition to a fault state in order to prevent damaging the NFC tag.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 depicts a network diagram illustrating an example network environment for NFC detection, in accordance with one or more example embodiments of the present disclosure, which may include one or more user devices 120 and a wireless power transmitting unit (PTU) 102. The one or more user devices 120 may be power receiving units (PRUs) operable by one or more user(s) 110. While FIG. 1 shows PRUs including a laptop 128 and smart devices 124 and 126, the disclosed principles are not limited thereto and may include any device capable of wireless charging (e.g., a lamp).

Figure 6:
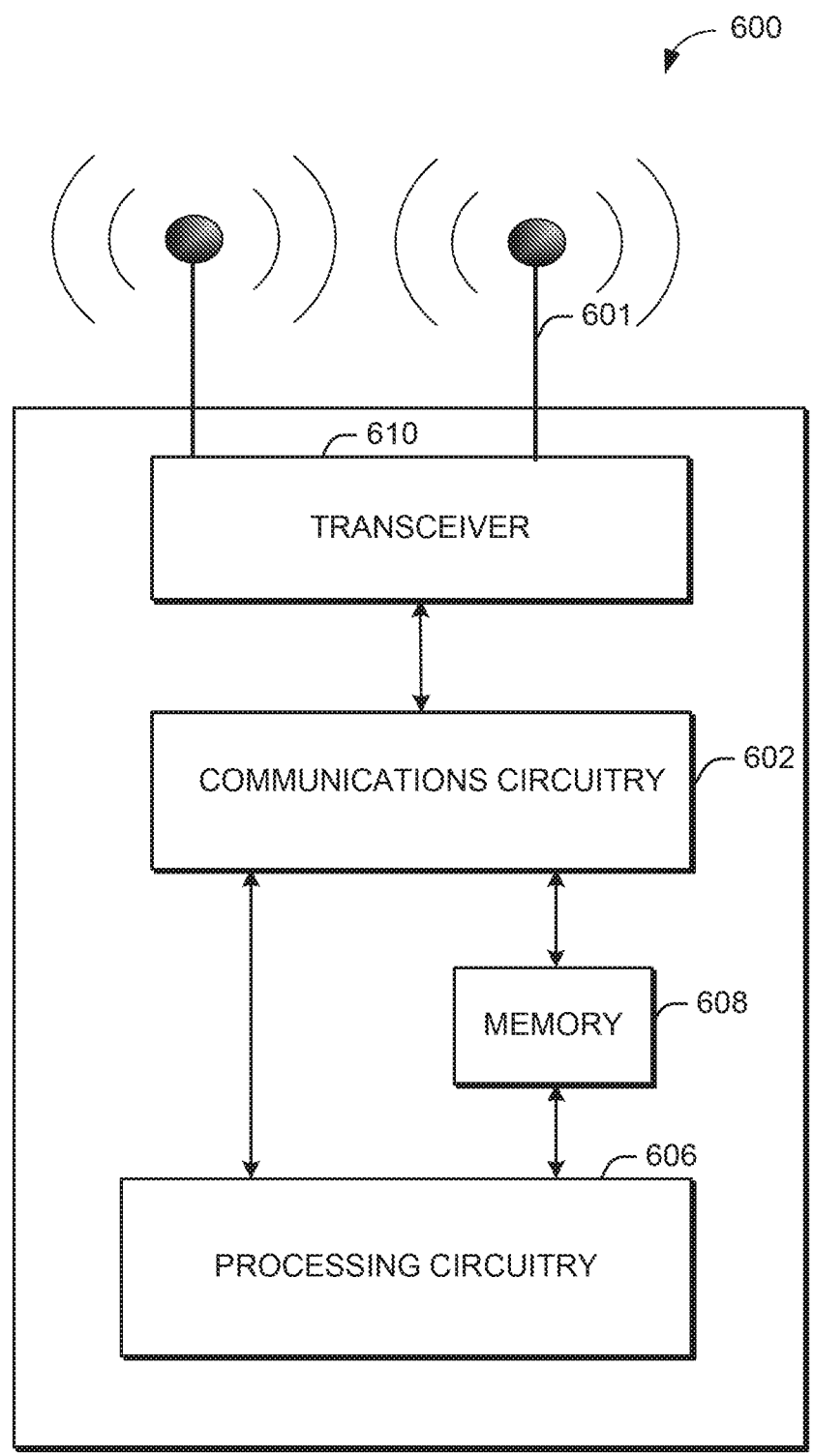
FIG. 6 illustrates a functional diagram of an example communication station that may be suitable for use as a user device, in accordance with one or more example embodiments of the disclosure.
Figure 7:
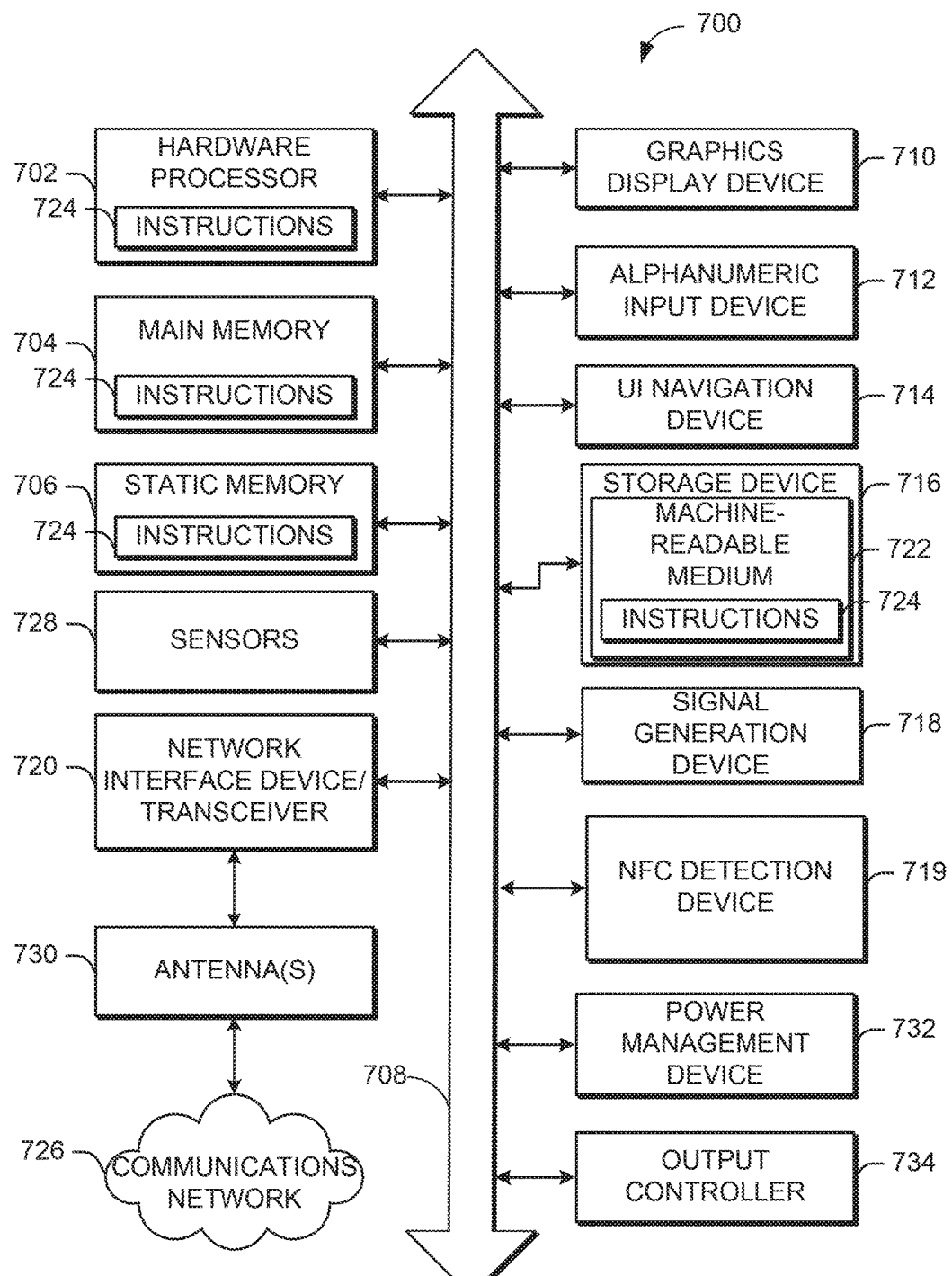
FIG. 7 illustrates a block diagram of an example machine upon which any of one or more techniques (e.g., methods) may be performed, in accordance with one or more embodiments of the disclosure.

In some embodiments, the user devices 120 and the PTU 102 may include one or more computer systems similar to that of the functional diagram of FIG. 6 and/or the example machine/system of FIG. 7.

The user device(s) 120 (e.g., 124, 126, or 128) may be capable of being wirelessly charged. The user device(s) 120 (e.g., 124, 126, or 128) may include any suitable processor-driven device including, but not limited to, a mobile device or a non-mobile, e.g., a static, device. For example, user device(s) 120 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a portable device, a non-portable device, a lamp, and intelligent device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), the NFC tag 142, and the PTU 102 may be configured to communicate with each other directly or via one or more communications networks 130 and/or 135 wirelessly or wired. The direct communication may include Bluetooth Low Energy (BLE), in-band modulation, or the like. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), the NFC tag 142, and the PTU 102 may include one or more communications antennas. Communications antenna may be any suitable type of antenna corresponding to the communications protocols used by the user device(s) 120 (e.g., user devices 124, 126 and 128), the NFC tag 142, and the PTU 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), the NFC tag 142, and the PTU 102 may include any suitable radio and/or transceiver for transmitting and/or receiving radio frequency (RF) signals in the bandwidth and/or channels corresponding to the communications protocols utilized by any of the user device(s) 120 the NFC tag 142, and the PTU 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

NFC is a wireless communication technology similar to Wi-Fi or Bluetooth. Typically, NFC is used to transfer data from one device to the other. For example, NFC may be used to transfer data from an NFC enabled mobile device to another NFC enabled mobile device, from a mobile device to a payment terminal or from an NFC tag to a mobile phone.

A simple way to use NFC technology may be a phone picking up information from a 'tag', usually embedded in a sticker, a wristband, a poster, a business card, a badge, or the like. In some examples, an NFC tag may be included within a user device and not external to the user device. NFC tags may contain small microchips with little antenna(s), which can store a small amount of information for transfer to another NFC device, such as a mobile phone. A tag may be programmed with one or more tasks based using, for example, an application running on a user device. With the tag created, the NFC tag may be placed, for example, at a desk at work. A user device may be swiped over the tag in order to receive the programmed information.

Different data types may be stored on an NFC tag. The actual amount of data varies depending on the type of NFC tag used, that is, different NFC tags may have different memory capacities. Usually, information is stored in a specific data format so that it can be reliably read by most devices and mobile phones.

Generally, NFC tags do not require batteries. NFC tags get their power from just being near a powered NFC device (e.g., a mobile device). NFC Tags work by an active device (e.g., a mobile device) generating a magnetic field which induces an electric current in the antenna of the passive device (e.g., the NFC Tag) which powers up the NFC Chip. The NFC Tag then creates a further magnetic field, which can in return be read by the active device (e.g., the mobile device) allowing data to be transferred.

In one embodiment, the PTU 102 may include a transmitting coil (e.g., coil 140), and the PRUs (e.g., user devices 120) may include a receiving coil. For example, energy may be transmitted from the transmitting coil to the receiving coil, by electromagnetic induction between the two coils. This may cause the transmission of charging power from the PTU to the PRU in response to determining that the PRU is located within the charging area. The PTU may communicate with a PRU to receive information, such as identification information, power received, power needed, location, etc.

In one embodiment, a PRU may advertise its information using one or more communication protocols. For example, the PRU may utilize communication protocols, such as bluetooth low energy (BLE), in-band modulation, or the like, to advertise or transfer its PRU information to a PTU. The PRU information may contain static or dynamic PRU parameters. It is understood that although advertisement is done through BLE or in-band modulation, any other communication protocols that may be used for communicating between two devices may be used.

In one embodiment, the PTU 102 may transition from an operational state to a fault state based at least in part on a detection of the NFC tag 142, which may be internal or external to a user device 120. In this example of FIG. 1, the NFC tag 142 is shown as being internal to user device 124. In other examples, the NFC tag 142 may be external (e.g., a bracelet, etc.) to the user device 124. Typically, the PTU 102 may be configured to operate in one or more states. For example, the PTU 102 may be in a PTU power save state, a PTU low-power state, a PTU power transfer state, etc. These states may be based at least in part on a wireless charging standard such as the AirFuel Alliance (AFA) wireless charging standard or any other wireless charging standard. The fault state may prevent the PTU from sending power to devices (e.g., the NFC tag 142) that may be in proximity of the PTU. This may prevent the NFC tag 142 from being damaged from exposure to the wireless charging of the PTU 102.

In one embodiment, during a discovery procedure (e.g., a handshake procedure, etc.) between user devices 120 and PTU 102, the user devices 120 may send information to the PTU 102. For example, if user device 124 is in need of wireless charging, the user device 124 may advertise that request to the PTU 102 or the user device 124 may receive an advertisement from PTU 102 that the PTU 102 is capable of performing the service of wirelessly charging the user device 124. The user device 124 and the PTU 102 may perform, for example, a handshake procedure that may communicate to the PTU 102 information associated with user device 124. The information may include various bits that are set based on the configuration of the user device 124. In order for the PTU 102 to determine when to transition to the fault state, the PTU 102 may analyze information received from the user device 124. The information may include information associated with the NFC tag 142. The user device 124 may transmit, for example, during the handshake procedure with the PTU, PRU static information including, but not limited to, whether an NFC tag (e.g., NFC tag 142) is supported and protected in the user device 124.

In one embodiment, the PTU 102 may receive the information including an NFC bit that may be set based at least in part on whether NFC is supported and/or protected on the user device 124. For example, after the user device 124 sets the NFC bit to "0," or "1," the user device 124 may send the information that includes the set NFC bit to the PTU 102. The PTU 102 may receive the information on an interface for communicating over the air. The PTU 102 may decode that information and may extract the NFC bit. The extracted NFC bit may be set to either "0" or "1." Based on the value of the NFC bit, the PTU 102 may transition (or not transition) to a different working state. For example, if the NFC bit is set to "0" in the information received from the user device 124, the PTU 102 may determine whether an NFC tag is detected in the proximity of the PTU or not. If the PTU 102 detects an NFC tag, the PTU 102 may transition to a fault state, such as a latching fault state or a local fault state. A latching fault state may be a fault state that may impact the wireless charging system, including, devices involved in the wireless charging system such as PRUs (e.g., user devices 120), PTU 102, or any other devices involved in the wireless charging system. A local fault state may be a fault state that affects the PTU 102.

In one embodiment, if the PTU 102 determines that the NFC bit is set to "1," the PTU 102 may determine whether an NFC tag 142 is detected. In that case, if the PTU does detect an NFC tag 142, then the PTU 102 may not transfer to a fault state and may continue its normal operation. If the PTU 102 had already detected the NFC tag 142, and the PTU 102 had already transitioned to a fault state due to the detection of the NFC tag 142, the PTU 102 may clear the fault and may resume normal operation.

In one embodiment, if the PTU 102 detects the NFC tag 142, and the PTU 102 does not receive a valid advertising or discover messages after a predetermined time, the PTU 102 may determine that detected NFC tag 142 is not protected and therefore the PTU 102 may transition to a fault state in order to prevent damaging the NFC tag. For example, if the PTU 102 detects the NFC tag 142 and does not receive a valid advertisement after 0.2 seconds, the PTU 102 may determine that the NFC tag 142 is not associated with a user device 120 and is an external NFC tag that may not be protected against wireless charging. In order to prevent exposure of the NFC tag 142 to the wireless charging of the PTU 102, the PTU 102 may transition to a fault state (e.g., latching fault state or local fault state). This will stop the PTU 102 from sending power to the NFC tag 142, which could have resulted in damaging the NFC tag 142. It is understood that the above descriptions are for purposes of illustration and are not meant to be limiting.

FIG. 2 depicts an illustrative PRU static parameter, in accordance with one or more example embodiments of the present disclosure.

Generally, a PRU may contain information, including data and parameters that the PRU may exchange with a PTU during the wireless charging of the PRU. Such information may assist the PTU in determining how to wirelessly charge the PRU. For example, a PRU static parameter characteristic element may contain, at least in part, static data that may be set on a PRU. The PRU static parameter characteristic element may be intended to enable a PTU to read the static data from the PRU. A PRU may communicate the static data using one or more fields associated with the static parameter characteristic element. An example field of the one or more fields may be the PRU information field, which may be used to identify one or more operational modes of the PRU.

Referring to FIG. 2, there is shown a bit field for PRU information field 200. The PRU information field 200 may contain one or more bits that may be set based at least in part on the PRU. The PRU information field 200 may include one or more bit fields, such as, an NFC receiver bit 202, a power control algorithm preference, an adjust power capability, a charge complete connected mode, a PTU test mode, and one or more bits that may be reserved for future use (RFU). For example, the NFC receiver bit 202 may contain information related to one or more NFC devices that may be associated with the PRU. For example, if the NFC receiver bit 202 is set to "1," this may indicate to the PTU that NFC is supported and/or protected. However, if the NFC receiver bit 202 is set to "0," then this may indicate to the PTU that NFC is not supported and/or not protected. For example, if a PRU is associated with an NFC tag or other NFC devices, which are supported and/or protected, the PRU may set the NFC receiver bit 202 to "1." The PTU receiving that information may determine that the PRU include or is associated with an NFC tag or other NFC devices. An associated NFC tag or other NFC devices may be included in the PRU or may be external to the PRU.

In one embodiment, a PTU may transition its operating mode based on determining the value of the NFC receiver bit 202. The PTU may transition to a fault state or may continue normal operation based on the value of the received NFC receiver bit 202. For example, if the NFC receiver bit 202 is set to "0" in the PRU information received from the PRU, the PTU may determine whether an NFC tag is detected in the proximity of the PTU or not. If the PTU detects an NFC tag, the PTU may transition to a fault state, such as a latching fault state or a local fault state. A latching fault state may be a fault state that may impact the wireless charging system, including, devices involved in the wireless charging system such as PRUs, PTU, or any other devices involved in the wireless charging system. A local fault state may be a fault state that affects the PTU.

In one embodiment, if the PTU determines that the NFC receiver bit 202 is set to "1," the PTU may determine whether an NFC tag or other NFC devices are detected. In that case, if the PTU does detect an NFC tag or other NFC devices, then the PTU may not transfer to a fault state. If the PTU had already detected the NFC tag or other NFC devices, and the PTU had already transitioned to a fault state due to the detection of the NFC tag or other NFC devices, the PTU may clear the fault and may resume normal operation.

In one embodiment, if the PTU detects an NFC tag or other NFC devices, the PTU may listen for messages that are typically received from a PRU. For example, an advertising message may be received from the PRU. The advertising message may include information that may determine that the device sending the advertising message is a PRU and not an NFC tag. In the case that the PTU does not receive a valid advertisement after a predetermined time, the PTU may determine that the detected NFC tag is not supported and/or protected and therefore the PTU may transition to a fault state in order to prevent damaging the NFC tag or the other NFC devices.

FIGS. 3A-3B depict illustrative PTU operation modes tables 300 and 350 respectively, in accordance with one or more embodiments of the disclosure.

Referring to FIG. 3A, the PTU operation modes table 300 may contain conditions for transitioning a PTU between one or more operation modes or states. The one or more operation modes or states may include, but not limited to, a PTU power save, a PTU low power, a PTU power transfer, PTU latching fault, PTU local fault, or the like. The one or more operations modes or states may be power modes or states. For example, a PTU may have an original state of PTU power save and may transition to PTU low power based on one or more conditions that may be optional or required.

In one embodiment, the PTU may transition to a PTU latching fault or a PTU local fault based on one or more conditions. The one or more conditions may be set in accordance with a standard, a system administrator, a manufacturer of the PTU and/or the PRU, user preferences, etc. For example, condition 302 may include one or more conditions for transitioning the PTU from an origin state to a destination state, when the condition 302 is met. The condition 302 may be required or may be optional based at least in part on a setting in accordance with a standard, a system administrator, or a user. Condition 302 may indicate that the PTU may transition to a fault state when condition 302 is met. According to an exemplary condition 302, if the PTU detects an NFC tag or other NFC devices, the PTU may listen for advertising messages that are typically received from a PRU. The advertising messages may include information that may determine that the device sending the advertising messages is a PRU and not an NFC tag. In the case that the PTU does not receive a valid advertising message after a predetermined time, the PTU may determine that the detected NFC tag is not protected, and therefore the PTU may transition to a fault state (e.g., a PTU latching fault or a PTU local fault) in order to prevent damaging the NFC tag or the other NFC devices. It is understood that this condition 302 is a non-limiting example of a condition to transition the PTU between an origin state and a destination state. Other conditions may be determined in order to transition the PTU to a fault state based on whether an NFC tag or other NFC devices were detected or not detected.

Referring to FIG. 3B, the PTU operation modes table 350 may contain conditions for transitioning a PTU between one or more operation modes or states. The one or more operation modes or states may include, but not limited to, a PTU power save, a PTU low power, a PTU power transfer, PTU latching fault, PTU local fault, or the like. These one or more operations modes or states may be power modes or states. For example, a PTU may have an original state of PTU power save and may transition to PTU low power based on one or more conditions that may be optional or required.

In one embodiment, the PTU may transition its operating mode based on condition 304 that may be associated with an NFC receiver bit on the PRU. For example, the PRU may set the NFC receiver bit in the PRU static parameter characteristic, which may be sent to the PTU. Under condition 304, the PTU may transition to a fault state or may continue normal operation based on the value of the NFC receiver bit. For example, condition 304 indicates that if the NFC receiver bit is set to "0" in the PRU information received from the PRU, the PTU may determine whether an NFC tag or another NFC device is detected in the proximity of the PTU or not. If the PTU detects an NFC tag or another NFC device, the PTU may transition to a fault state, such as a latching fault state or a local fault state. A latching fault state may be a fault state that may impact the wireless charging system, including, devices involved in the wireless charging system such as PRUs, PTU, or any other devices involved in the wireless charging system. A local fault state may be a fault state that affects the PTU.

In one embodiment, other conditions may be utilized to transition or not transition the PTU from an origin state to a destination state. For example, if the PTU determines that the NFC receiver bit is set to "1," the PTU may then determine whether an NFC tag or other NFC devices are detected. In that case, if the PTU does detect an NFC tag or other NFC devices, then the PTU does not transfer to a fault state. If the PTU had already detected the NFC tag or other NFC devices, and the PTU had already transitioned to a fault state due to the detection of the NFC tag or other NFC devices, the PTU may clear the fault and may resume normal operation in case the NFC receiver bit is set to "1." It is understood that the above descriptions are for purposes of illustration and are not meant to be limiting.

Figure 4A:
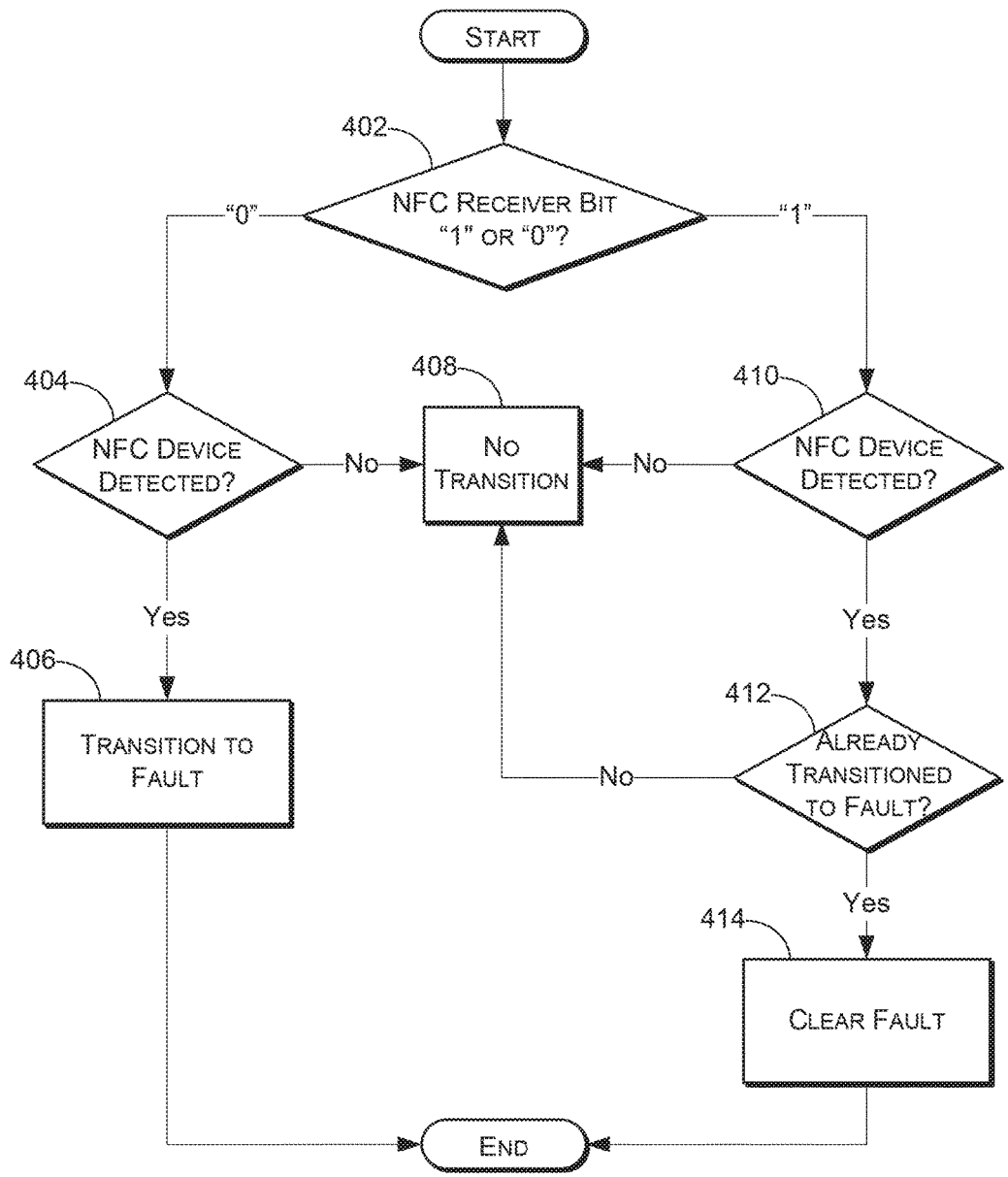
FIGS. 4A-4B depict illustrative flow diagrams for NFC detection, in accordance with one or more example embodiments of the present disclosure.
Figure 4B:
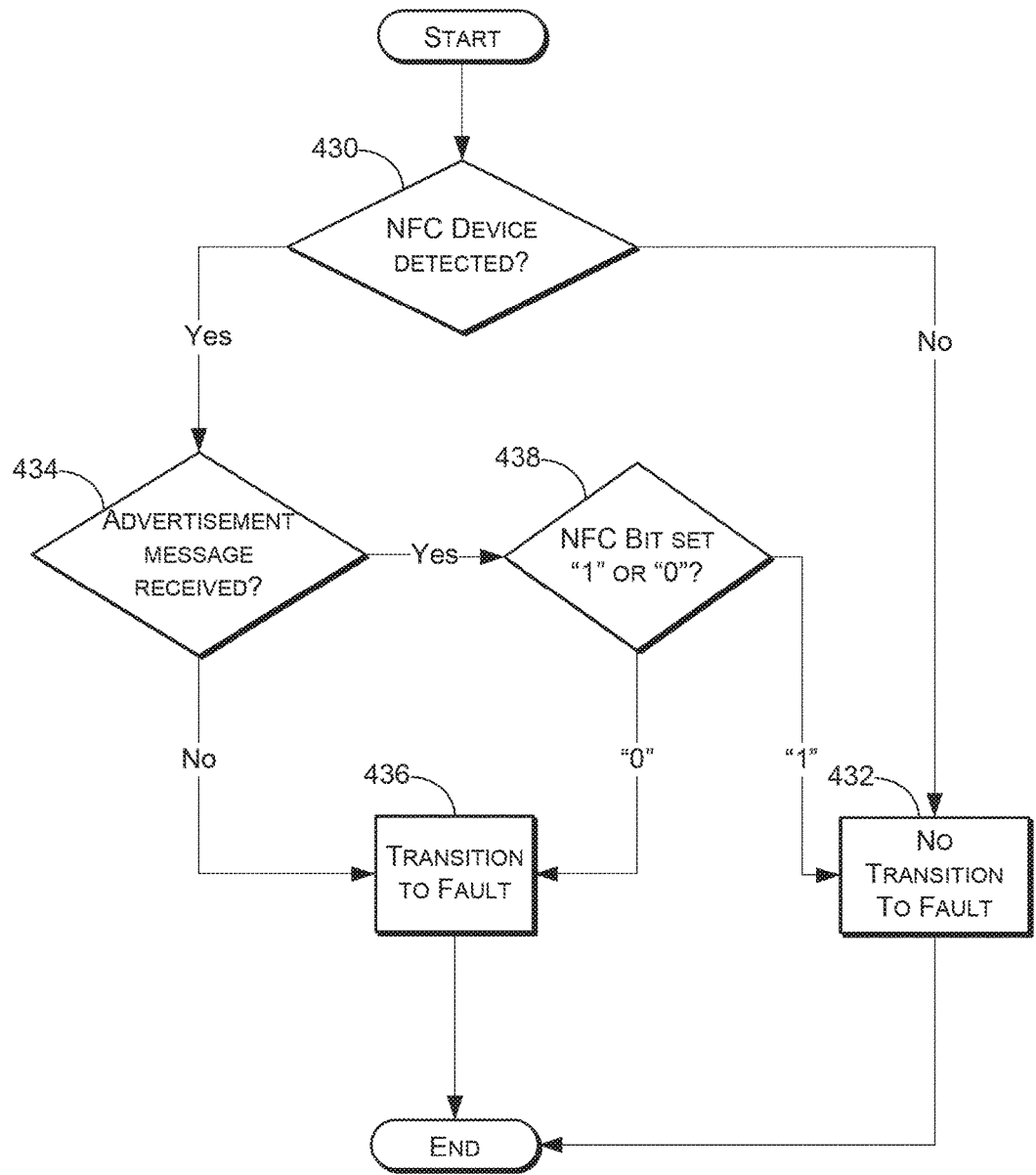

FIGS. 4A-4B depicts illustrative flow diagrams for NFC detection, in accordance with one or more example embodiments of the present disclosure.

Referring to FIG. 4A, there is shown a flow diagram for NFC detection that may facilitate determining the transition of a PTU (e.g., PTU 102 of FIG. 1) one or more operation modes or states. For example, an NFC detection system may facilitate the transition of one or more operation modes of a PTU based at least in part on one or more conditions. The one or more operation modes may include, but not limited to, a PTU power save, a PTU low power, a PTU power transfer, PTU latching fault, PTU local fault, or the like. These one or more operations modes or states may be power modes or states. The one or more conditions made include, but not limited to, detection of NFC devices, analysis of data received from one or more PRUs in the proximity of the PTU, or other conditions set in accordance to a standards, a system administrator, a manufacturer of the PTU and/or the PRU, user preferences, etc.

A PTU may detect the presence of one or more devices that may be in proximity of its charging surface. The PTU may utilize one or more discovery procedures to discover devices in its proximity. For example, the PTU may determine whether one or more PRUs, e.g., (user devices 120 of FIG. 1) require to be wirelessly charged by the PTU. The one or PRUs may include, or may be associated with, one or more NFC devices (e.g., NFC tags). The PTU may also discover the one or more PRUs in the proximity of the PTU based on received messages from the one or more PRUs. For example, the PTU may receive advertisement messages, service request messages or handshake messages, or the like from these PRUs. Based on the discovered devices, the PTU may determine whether to continue normal operation (e.g., wirelessly charging devices) or may determine whether to transition to other states or modes, such as fault states.

In one embodiment, in order for the PTU to determine when to transition to the fault state, the PTU may analyze PRU information received from a PRU (e.g., user devices 120 of FIG. 1) that may be associated with an NFC device (e.g., an NFC tag). The PRU may transmit during, for example, the handshake procedure with the PTU, PRU static information including, but not limited to, whether an NFC device is supported and/or protected by the PRU.

In one embodiment, the PRU information may include an NFC bit (e.g., NFC receiver bit) that may be set based at least in part on whether NFC is supported and/or protected by the PRU. For example, after the PRU sets the NFC receiver bit to "0" or "1," the PRU may send the PRU information that includes the set NFC receiver bit to the PTU that may be providing the wireless charge. The PTU may receive the PRU information on an interface for communicating over the air. The PTU may decode the PRU information and may extract the NFC receiver bit. The extracted NFC receiver bit may be set to either "0" or "1." Based at least in part on the value of the NFC receiver bit, the PTU may transition (or not transition) to a different operational state. The NFC receiver bit may contain information related to an NFC device. For example, if the NFC receiver bit is set to "1," this may indicate to the PTU that NFC is supported and/or protected. However, if the NFC receiver bit is set to "0," then this may indicate to the PTU that NFC is not supported and/or not protected.

Referring to FIG. 4A, an NFC detection flow diagram may start and proceed to block 402.

At block 402, the PTU may determine whether the NFC receiver bit is set to "1" or "0." The PTU may transition its operating mode based on determining the value of the NFC receiver bit. The PTU may transition to a fault state or may continue normal operation based on the value of the NFC receiver bit.

At block 404, in case the PTU determines that the NFC receiver bit is set to "0," in the PRU information received from the PRU, the PTU may determine whether an NFC device is detected in the proximity of the PTU or not.

At block 406, if the PTU detects an NFC device, the PTU may transition to a fault state, such as a latching fault state or a local fault state. A latching fault state may be a fault state that may impact the wireless charging system, including, devices involved in the wireless charging system such as PRUs, PTU, or any other devices involved in the wireless charging system. A local fault state may be a fault state that affects the PTU. Transitioning to a fault state prevents the PTU from charging the detected NFC device, which is not protected according to the NFC receiver bit being equal to "0."

At block 408, if the PTU did not detect an NFC device in the proximity to the PTU, then the PTU does not need to transition to a fault state and may continue normal operation.

If at block 402, the PTU determines that the NFC receiver bit is equal to "1," the PTU may determine whether an NFC device is detected (block 410). If the PTU does not detect an NFC device at block 410, the PTU does not need to transition to a fault state and may continue normal operation (block 408).

If at block 410 the PTU determined that an NFC device was detected, the PTU may then analyze its operation mode or state, for example, to determine whether the PTU is in a PTU power save, a PTU low power, a PTU power transfer, a PTU latching fault, a PTU local fault, or the like.

At block 412, the PTU may determine whether it is in a fault mode or state (e.g., a latching fault or a local fault). In case the PTU determines that it is not in a fault mode or state, the PTU may not need to transition to another state and may continue normal operation (block 408). However, if the PTU does determine that it is in a fault state, the PTU may then clear the fault mode or state and transition to another mode or state (block 414). Since the NFC receiver bit is set to "1," it indicates that the NFC device is supported and/or protected. Further, since the NFC device was detected by the PTU, then the PTU does not need to be in a fault state. Therefore, if the PTU, under those conditions, was in a fault state, the PTU may clear the fault mode and transition to another mode or state (e.g., a PTU power save, a PTU low power, a PTU power transfer, etc.).

The PTU may restart the process periodically or based on a predetermined interval set in accordance to a communication standard, a user preference, a system administrator, etc.

Referring to FIG. 4B, an NFC detection flow diagram may start and proceed to block 430.

At block 430, the PTU may determine whether an NFC device (e.g., an NFC tag) is detected in proximity to the PTU. The PTU may detect the presence of an NFC device based at least in part on a discovery procedure used to discover devices in proximity to the charging surface area of the PTU. A discovery procedure may include scanning devices that are within range of the charging field of the PTU. The PTU may also discover devices in proximity to the PTU based on advertisement messages, service request messages, handshake messages, or the like that may be received from these devices. Receiving any of these messages may indicate to the PTU whether additional information corresponding to the detected NFC device exists or not.

At block 432, if the PTU does not detect at least one NFC device, the PTU may not transition to a fault mode or state. That is the PTU may continue its operation using one of the operation modes. In that case, the PTU continues to charge devices that are in proximity to the PTU's charging surface.

If the PTU detects at least one NFC device, the PTU may determine at block 434 whether advertisement messages, service request messages, or handshake messages are received from any devices in the proximity of the PTU. As explained above, these types of messages may include PRU static information that may assist the PTU in determining whether to transition between the one or more operation modes. The PTU may wait for a predetermined time to receive at least one of the above messages. For example, if the PTU after a few seconds (e.g., 0.2 seconds) does not receive at least one of the above messages, the PTU may then determine that a message is not received.

If after the predetermined time, the PTU may determine that a message is not received from any PRUs in the proximity of the PTU. Consequently, at block 436, since an NFC device was detected (block 430) and no message was received from a PRU (block 434), then the PTU may determine that the NFC device is not associated with a PRU and may determine to transition to a fault state or mode (e.g., latching fault and/or local fault). In that case, the PTU may stop generating charging power that may cause damage to the detected NFC devices.

If the PTU does receive a message from at least one PRU, at block 438, the PTU may extract the PRU static information that may be encoded in the received message. The PTU may determine whether the detected NFC device is associated with the PRU that sent the message to the PTU. For example, if the PTU receives an advertisement message from a PRU, the PTU may extract the PRU static information from the advertisement message in order to determine whether the NFC receiver bit is set to "1" or "0." The PTU may also extract information that may determine that the detected NFC device is associated with the PRU. If the PTU determines that the NFC receiver bit is set to "0," then the PTU may have essentially determined that an NFC device is detected, that the NFC device is associated with the PRU, and the PRU information included in the received message from the PRU indicated that the NFC receiver bit is set to a value that does not support and/or protect the NFC device. In that case, the PTU may transition to a fault state (block 436) in order to prevent the detected NFC device from being damaged by the power generated by the PTU.

If the NFC receiver bit is set to "1," then the PTU may determine that the detected NFC device is supported and/or protected by the PRU that sent the message to the PTU. In that case, the PTU at block 432 may not need to transition to a fault state and may continue operating and wirelessly charging devices in proximity to it charging service.

The PTU may restart the process periodically or based on a predetermined interval set in accordance to a communication standard, a user preference, a system administrator, etc.

Figure 5A:
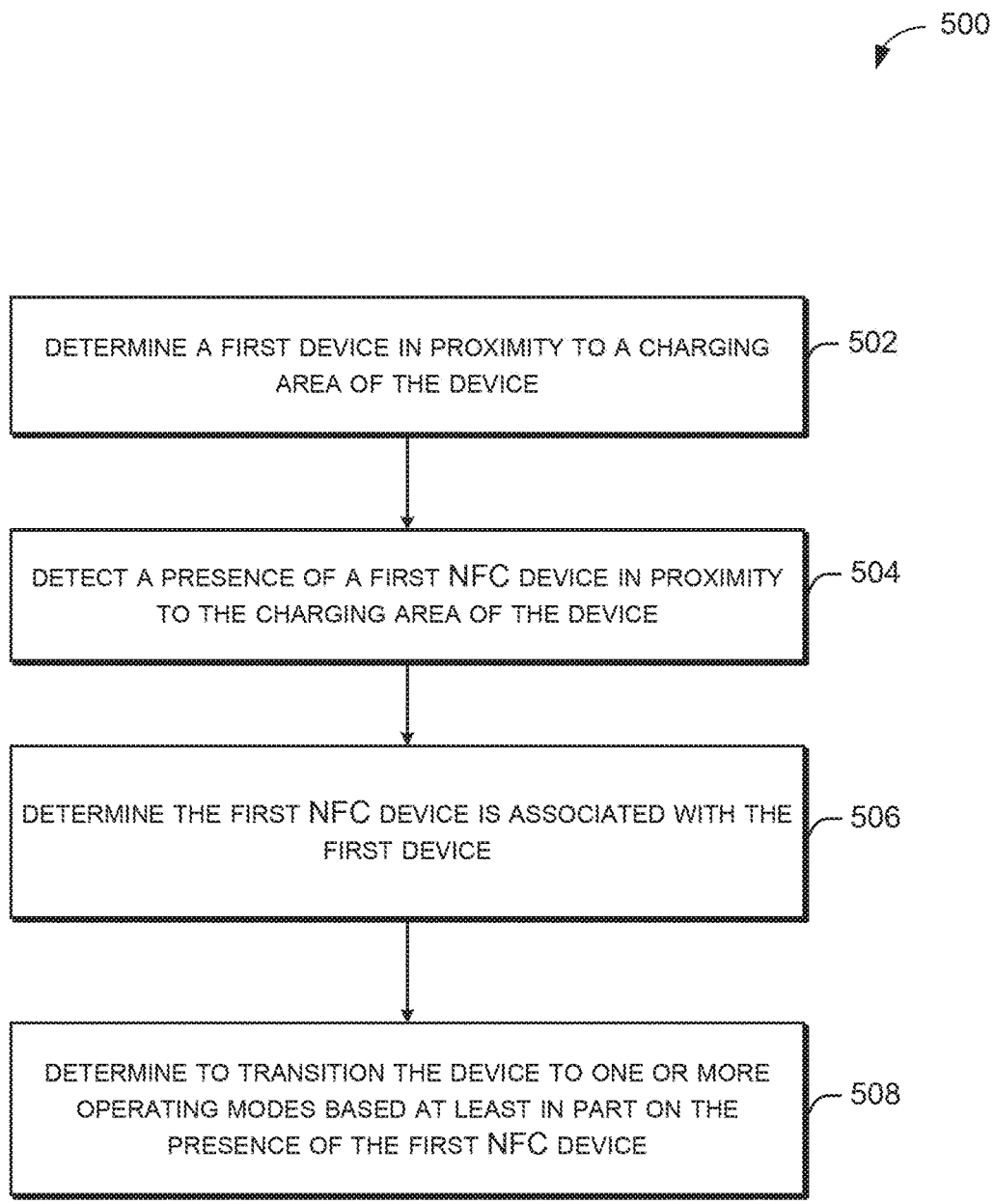
FIG. 5A illustrates a flow diagram of an illustrative process for NFC detection, in accordance with one or more embodiments of the disclosure.

FIG. 5A illustrates a flow diagram of illustrative process 500 for NFC detection, in accordance with one or more embodiments of the disclosure.

At block 502, a PTU (e.g., PTU 102 of FIG. 1) may determine the presence of a PRU (e.g., user devices 120 of FIG. 1) in proximity to a charging area of the PTU. For example, the PTU may detect the presence of a PRU that may be in proximity of its charging surface. The PTU may utilize one or more discovery procedures to discover devices in its proximity. For example, the PTU may determine whether a PRU requires to be wirelessly charged by the PTU. The PRU may include, or may be associated with, one or more NFC devices (e.g., NFC tags). The PTU may also discover the PRU in the proximity of the PTU based on received messages from the PRU. For example, the PTU may receive advertisement messages, service request messages or handshake messages, or the like from the PRU.

At block 504, the PTU may detect the presence of an NFC device (e.g., NFC tag) in proximity to the charging area of the PRU. For example, the PTU may utilize the discovery procedures or other procedures in order to detect whether an NFC device is in the proximity of the PTU. In some embodiments, the PTU may detect the presence of an NFC device based on the discovered PRU. For example, during a handshake procedure between the PRU and the PTU, the PRU may send information to the PTU. The PRU and the PTU may perform handshake procedure that may communicate to the PTU information associated with PRU. The information may include various bits that are set based on the configuration of the PRU. In order for the PTU to determine when to transition to the fault state, the PTU may analyze information received from the PRU. The information may include information associated with the NFC device. The PRU may transmit during, for example, the handshake procedure to the PTU, PRU static information including, but not limited to, whether in NFC device is supported and protected in the PRU.

At block 506, the PTU may determine that the NFC device is associated with the PRU. If the PTU determines that the NFC devices is associated with the PRU, then the PTU may have to determine additional information since an NFC device is detected by the PTU. For example, the PTU may utilize the information received from the PRU, which may include, but is not limited to, an NFC receiver bit that may be sent by the PRU. The NFC receiver bit may be set to either "0" or "1." For example, if the NFC receiver bit is set to "0," then the PTU may determine that the detected NFC device is not protected and may not be supported by the PRU. In that case, the PTU may have to determine whether to continue charging or stop charging devices in proximity to the PTU. If the NFC receiver bit is set to "1," then the PTU may determine that the detected NFC device is protected and is supported by the PRU. In that case, the PTU may continue performing its operation (e.g., wirelessly charging devices).

At block 508, the PTU may determine to transition the PTU to one or more operating modes based at least in part on the presence of the NFC device. The PTU may determine whether to continue normal operation (e.g., wirelessly charging devices) or may determine whether to transition to other states or modes, such as fault states.

Figure 5B:
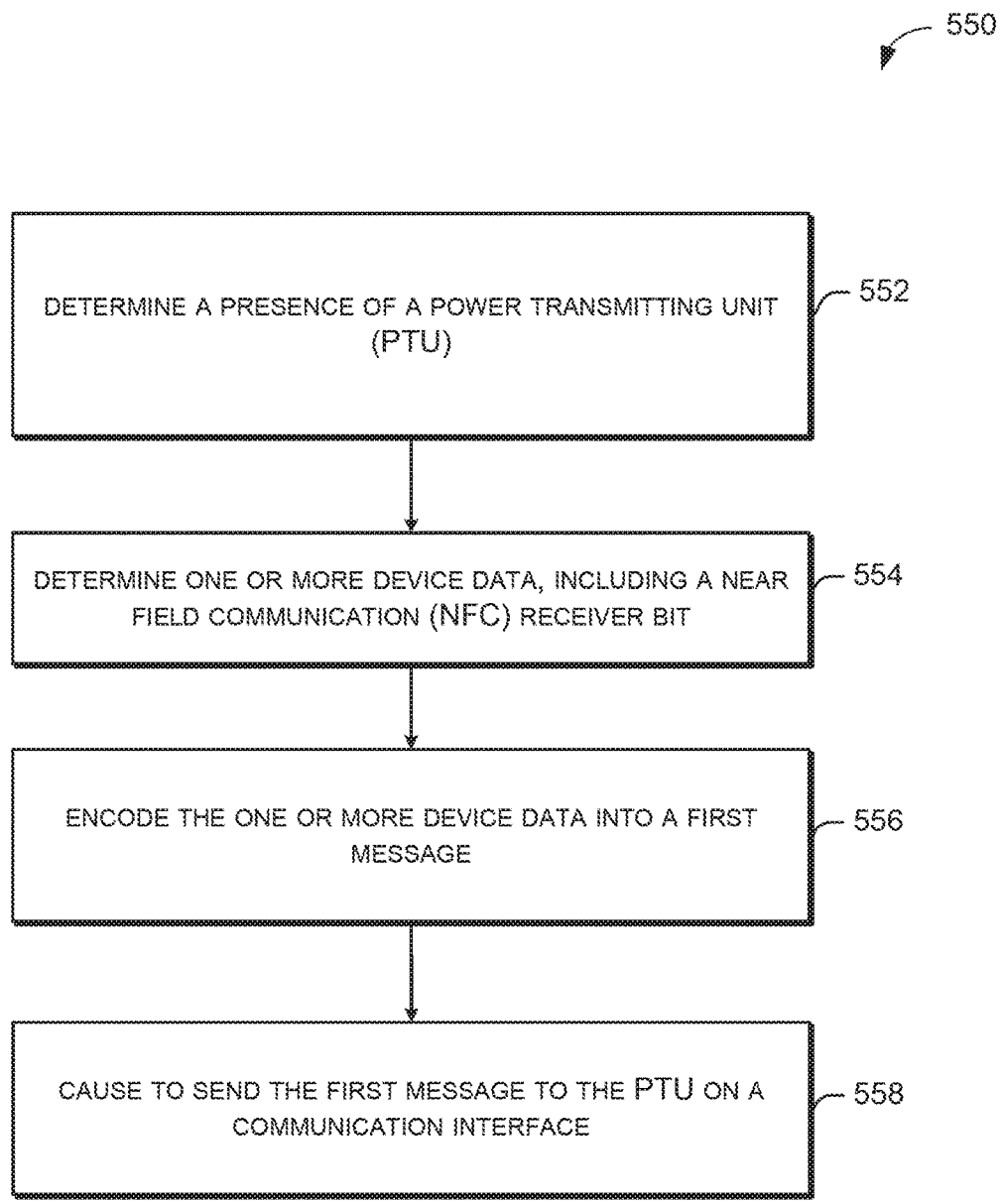
FIG. 5B illustrates a flow diagram of an illustrative process for NFC detection, in accordance with one or more embodiments of the disclosure.

FIG. 5B illustrates a flow diagram of illustrative process 550 for NFC detection, in accordance with one or more embodiments of the disclosure.

At block 552, a PRU (e.g., user devices 120 of FIG. 1) may determine the presence of a PTU (e.g., PTU 102 of FIG. 1). The PTU may include a surface area that be used to charge one or more PRUs. The PTU's current conducted through its coil generates a magnetic field such that when the PRU is placed in the PTU's magnetic field area, the PRU may be wirelessly charged.

At block 554, the PRU may determine one or more device data (e.g., PRU static information), including an NFC receiver bit that may be set by the PRU before sending a message to the PTU. The message may include, but is not limited to, a handshake message, an advertisement message, a service request message, or the like. When the PRU is placed in the PTU's magnetic field area, the PRU may send its operation information to the PTU during various stages of the wireless charging. For example, during a handshake procedure, the PRU may advertise its capabilities to the PTU.

At block 556, the PRU may include the one or more device data into the message before sending the message to the PTU. In order to include the one or more device data into the message, the PTU may encode the one or more data into the message. The one or more device data may include PRU static information (e.g., PRU information 200 of FIG. 2). An NFC receiver bit may contain information related to NFC devices that may be associated with the PRU. For example, if the NFC receiver bit is set to "1," this may indicate to the PTU that NFC is supported and/or protected by the PRU. However, if the NFC receiver bit is set to "0," then this may indicate to the PTU that NFC is not supported and/or not protected.

At block 558, the PRU may then send the message to the PTU. The PRU may send the message to the PTU using one or more communication standards (e.g., BLE, Wi-Fi, in-band modulation, etc.). The message may include at least in part the value of the NFC receiver bit that may have been encoded and or set by the PRU in the one or more device data. The PTU may receive the one or more data from PRU. The one or more data may determine that the PRU includes or is associated with an NFC tag or other NFC devices. An associated NFC tag or other NFC devices may be included in the PRU or may be external to the PRU. The process may repeat periodically, in accordance to a standard, a system administrator, or user preferences, etc. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an PTU 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, the alphanumeric input device 712, and the UI navigation device 714 may be a touch screen display. The machine 700 may additionally include a storage device (i.e., drive unit) 716, a signal generation device 718 (e.g., a speaker), an NFC detection device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The NFC detection device 719 may carry out or perform any of the operations and processes (e.g., processes 500 and 550) described and shown above. For example, the NFC detection device 719 may be configured to facilitate a PTU to transition from a working state to a fault state based at least in part on a determination of an NFC device, such as an NFC tag.

The NFC detection device 719 may be configured to analyze PRU information received from a PRU that may be associated with an NFC device (e.g., an NFC tag). The NFC detection device 719 may be configured to transmit during, for example, the handshake procedure with the PTU, PRU static information including, but not limited to, whether the NFC device is supported and protected by the PRU.

The NFC detection device 719 may be configured to include PRU information, including but not limited to an NFC bit that may be set based at least in part, on whether NFC is supported and/or protected on a PRU. For example, after the NFC bit is set to "0," or "1," the NFC detection device 719 may be configured to send the PRU information that includes the set NFC bit to the PTU. The NFC detection device 719 may be configured to receive the PRU information on an interface for communicating over the air. The NFC detection device 719 may be configured to decode the PRU information and may be configured to extract the NFC bit. The extracted NFC bit may be set to either "0" or "1." Based on the value of the NFC bit, the NFC detection device 719 may be configured to transition (or not transition) the PTU to a different working state.

The NFC detection device 719 may be configured to determine whether the NFC bit is set to "0" or "1," in order to determine whether to transition to a fault state or not. For example, if the NFC bit is set to "0" in the PRU information received from the PRU, the NFC detection device 719 may be configured to determine whether an NFC tag is detected in the proximity of the PTU or not. If an NFC device is detected, the NFC detection device 719 may be configured to transition the PTU to a fault state, such as a latching fault state or a local fault state. A latching fault state may be a fault state that may impact the wireless charging system, including, devices involved in the wireless charging system such as PRUs, PTU, or any other devices involved in the wireless charging system. A local fault state may be a fault state that affects the PTU.

The NFC detection device 719 may be configured to determine whether an NFC tag or other NFC devices are detected if it is determined that the NFC bit is set to "1." In that case, if an NFC tag or other NFC devices is not detected, then the NFC detection device 719 may not transfer the PTU to a fault state. If the PTU had already detected the NFC tag or other NFC devices, and the PTU had already transitioned to a fault state due to the detection of the NFC tag or other NFC devices, the NFC detection device 719 may clear the fault on the PTU and may resume normal operation.

The NFC detection device 719 may be configured to listen for advertising messages that may be typically received from a PRU. The advertising messages may include information that may determine that the device sending the advertising messages is a PRU and not an NFC tag. In the case that the PTU does not receive a valid advertisement after a predetermined time, the NFC detection device 719 may be configured to determine that detected NFC tag is not protected and therefore the PTU may transition to a fault state in order to prevent damaging the NFC tag.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions; and at least one processor of one or more processors configured to access the at least one memory, wherein the at least one processor is configured to execute the computer-executable instructions to determine a first device in proximity to a charging area of the device; detect a presence of a first NFC device in proximity to the charging area of the device; determine the first NFC device is associated with the first device; and determine to transition the device from a first operating mode to a second operating mode based at least in part on the presence of the first NFC device.

The implementations may include one or more of the following features. The first operating mode and the second operating mode include at least in part a power transmitting unit (PTU) power save, PTU low power, PTU power transfer, PTU latching fault, or PTU local fault. The at least one processor may be further configured to execute the computer-executable instructions to receive a first message from the first device on a communication interface; and extract device data encoded in the first message. The instructions to determine to transition the device may further includes the instructions to determine a first message is not received from the first device within a predetermined time; and determine the second operating mode is at least one of a power transmitting unit (PTU) latching fault or a PTU local fault mode. The communication interface is in accordance with Bluetooth low energy (BLE), near field communication (NFC), in-band modulation, or Wi-Fi. The extracted device data include one or more power receiving unit (PRU) static data, wherein the PRU static data includes at least in part an NFC receiver bit. The instructions to determine to transition the device may further includes the instructions to determine the NFC receiver bit is set to a first value; and determine the second operating mode is at least one of a power transmitting unit (PTU) latching fault or a PTU local fault mode. The at least one processor may be further configured to execute the computer-executable instructions to determine the NFC receiver bit is set to a second value; determine an operating mode of the device is a power transmitting unit (PTU) latching fault mode or a PTU local fault mode; and transition the operating mode of the device from the PTU latching fault mode or the PTU local fault mode to at least one of a PTU power save, a PTU low power, or a PTU power transfer. The device may further include a transceiver configured to transmit and receive wireless signals. The device may further comprise one or more antennas coupled to the transceiver.

According to example embodiments of the disclosure, there may be a non-transitory computer-readable medium storing computer-executable instructions which, when executed by a processor, cause the processor to perform operations. The operations may include determining a presence of a power transmitting unit (PTU); determining one or more device data, including a near field communication (NFC) receiver bit; encoding the one or more device data into a first message; and causing to send the first message to the PTU on a communication interface.

The implementations may include one or more of the following features. The communication interface is in accordance with bluetooth low energy (BLE), near field communication (NFC), in-band modulation, or Wi-Fi. The PTU may include a wireless charging surface. The computer-executable instructions cause the processor to further perform operations comprising encoding the NFC receiver bit based on an association with a first NFC device. The computer-executable instructions cause the processor to further perform operations comprising setting the NFC receiver bit to indicate that the first NFC device is supported or protected. The computer-executable instructions cause the processor to further perform operations comprising setting the NFC receiver bit to indicate that the first NFC device is not supported or not protected.

According to example embodiments of the disclosure, there may include a method. The method may include determining, by at least one processor, a first device in proximity to a charging area of a second device; detecting, by the at least one processor, a presence of a first NFC device in proximity to the charging area of the second device; determining, by the at least one processor, the first NFC device is associated with the first device; and determining, by the at least one processor, to transition the second device from a first operating mode to a second operating mode based at least in part on detecting the presence of the first NFC device.

The implementations may include one or more of the following features. The first operating mode and the second operating mode include at least in part a power transmitting unit (PTU) power save, PTU low power, PTU power transfer, PTU latching fault, or PTU local fault. The method may further include receiving a first message from the first device on a communication interface. The method may include extracting device data encoded in the first message. The determining to transition the second device may further comprise determining a first message is not received from the first device within a predetermined time; and determining the second operating mode is at least one of a power transmitting unit (PTU) latching fault or a PTU local fault mode. The communication interface is in accordance with Bluetooth low energy (BLE), near field communication (NFC), in-band modulation, or Wi-Fi. The extracted device data include one or more power receiving unit (PRU) static data, wherein the PRU static data includes at least in part an NFC receiver bit. The determining to transition the device may further comprise determining the NFC receiver bit is set to a first value; and determining the second operating mode is at least one of a power transmitting unit (PTU) latching fault or a PTU local fault mode. The method may further include determining the NFC receiver bit is set to a second value. The method may include determining an operating mode of the device is a power transmitting unit (PTU) latching fault mode or a PTU local fault mode. The method may include transitioning the operating mode of the device from the PTU latching fault mode or the PTU local fault mode to at least one of a PTU power save, a PTU low power, or a PTU power transfer.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of one or more processors configured to access the at least one memory, wherein the at least one processor is configured to execute the computer-executable instructions to:
      detect a presence of a near field communication (NFC) device in proximity to a charging area of the device;
      determine the NFC device is associated with a first device;
      identify an NFC receiver bit indicating a protection status of the NFC device; and
      determine to transition the device from a first operating mode to a second operating mode based at least in part on the NFC receiver bit and the presence of the NFC device.

2. The device of claim 1, wherein the first operating mode and the second operating mode include at least in part a power transmitting unit (PTU) power save, a PTU low power, a PTU power transfer, a PTU latching fault, or a PTU local fault.

3. The device of claim 1, wherein the at least one processor is further configured to execute the computer-executable instructions to:
   receive a first message from the first device on a communication interface; and
   extract device data encoded in the first message.

4. The device of claim 3, wherein the communication interface is in accordance with bluetooth low energy (BLE), near field communication (NFC), in-band modulation, or Wi-Fi.

5. The device of claim 3, wherein the extracted device data includes one or more power receiving unit (PRU) static data, and wherein the PRU static data includes at least in part the NFC receiver bit.

6. The device of claim 5, wherein the instructions to determine to transition the device further includes the instructions to:
   determine the NFC receiver bit is set to a first value; and
   determine the second operating mode is at least one of a power transmitting unit (PTU) latching fault or a PTU local fault mode.

7. The device of claim 5, wherein the at least one processor is further configured to execute the computer-executable instructions to:
   determine the NFC receiver bit is set to a second value, wherein the instructions to determine to transition the device comprise executing the instructions to:
      determine that the first operating mode of the device is a power transmitting unit (PTU) latching fault mode or a PTU local fault mode; and
      transition the first operating mode of the device from the PTU latching fault mode or the PTU local fault mode to at least one of a PTU power save, a PTU low power, or a PTU power transfer.

8. The device of claim 1, wherein the instructions to determine to transition the device further include the instructions to:
   determine a first message is not received from the first device within a predetermined time; and
   determine the second operating mode is at least one of a power transmitting unit (PTU) latching fault or a PTU local fault mode.

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which, when executed by a processor, cause the processor to perform operations comprising:
determining a presence of a power transmitting unit (PTU);
determining one or more device data, including a near field communication (NFC) receiver bit indicating whether an NFC device is protected;
encoding the one or more device data into a first message; and
causing to send the first message to the PTU on a communication interface.

12. The non-transitory computer-readable medium of claim 11, wherein the communication interface is in accordance with bluetooth low energy (BLE), near field communication (NFC), in-band modulation, or Wi-Fi.

13. The non-transitory computer-readable medium of claim 11, wherein the PTU includes a wireless charging surface.

14. The non-transitory computer-readable medium of claim 11, wherein the computer-executable instructions cause the processor to further perform operations comprising encoding the NFC receiver bit based on an association with a first NFC device.

15. The non-transitory computer-readable medium of claim 14, wherein the computer-executable instructions cause the processor to further perform operations comprising setting the NFC receiver bit to indicate that the NFC device is protected.

16. The non-transitory computer-readable medium of claim 14, wherein the computer-executable instructions cause the processor to further perform operations comprising setting the NFC receiver bit to indicate that the NFC device is not protected.

17. A method comprising:
detecting, by at least one processor, a presence of a near field communication (NFC) device in proximity to a charging area of a charging device;
receiving, by the at least one processor, a first message from a device on a communication interface, wherein the first message comprises an NFC receiver bit indicating a protection status of the NFC device;
determining, by the at least one processor, the NFC device is associated with the device; and
determining, by the at least one processor, to transition the charging device from a first operating mode to a second operating mode based at least in part on detecting the presence of the NFC device and on the NFC receiver bit.

18. The method of claim 17, wherein the first operating mode and the second operating mode include at least in part a power transmitting unit (PTU) power save, a PTU low power, a PTU power transfer, a PTU latching fault, or PTU local fault.

19. The method of claim 18, wherein determining to transition the charging device further comprises:
determining a first message is not received from the device within a predetermined time; and
determining the second operating mode is at least one of a power transmitting unit (PTU) latching fault or a PTU local fault mode.

20. The method of claim 17, further comprising:
receiving a first message from the first device on a communication interface; and
extracting device data encoded in the first message.

* * * * *